April 30, 1968      W. W. POPYK      3,381,111

ELECTRIC HEATING BOILER

Filed Jan. 21, 1966      2 Sheets-Sheet 1

INVENTOR
WILLIAM W. POPYK
BY

ATTORNEYS

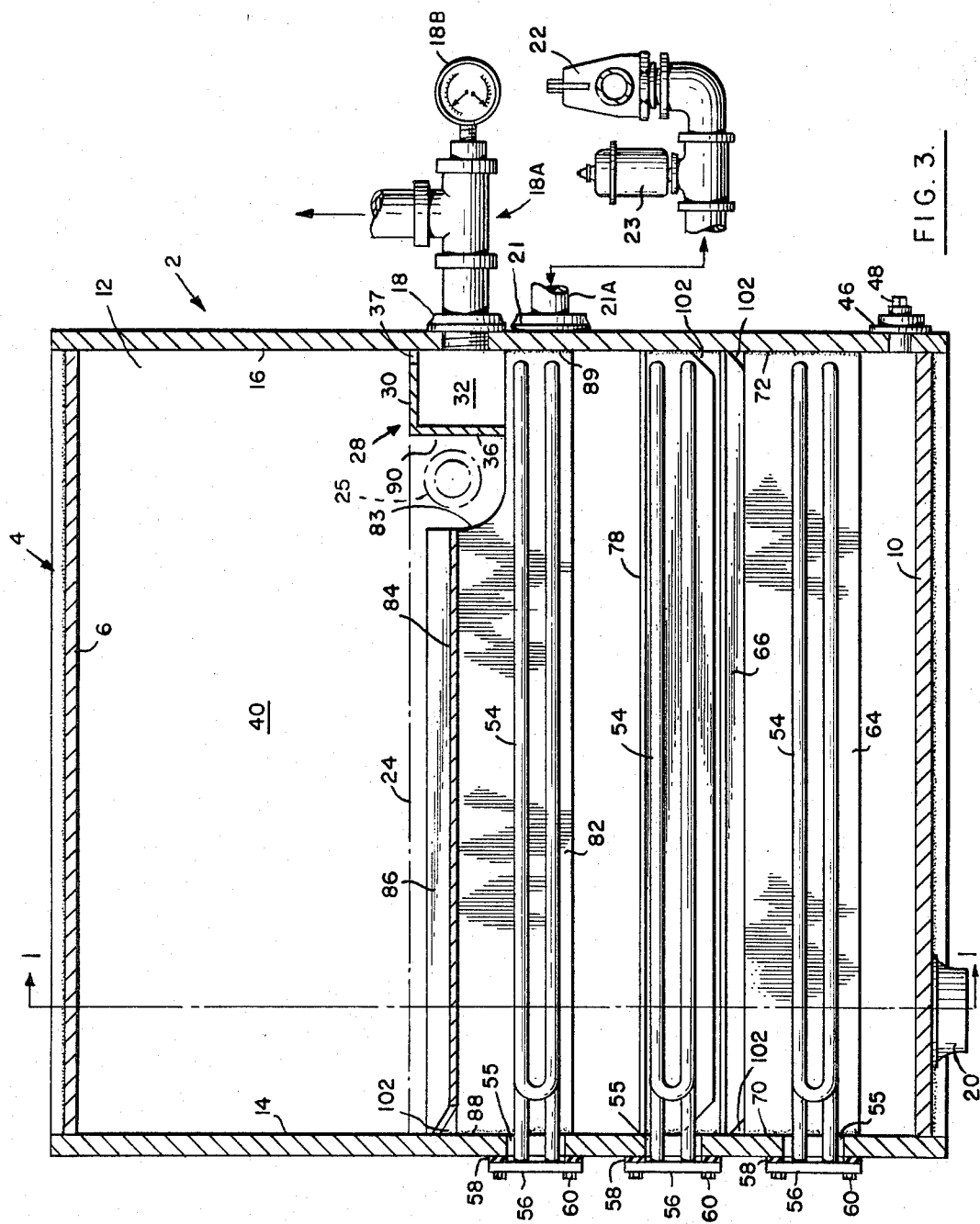

United States Patent Office 3,381,111
Patented Apr. 30, 1968

3,381,111
ELECTRIC HEATING BOILER
William W. Popyk, Allentown, Pa., assignor to General Machine Company, Inc., Emmaus, Pa., a corporation of Pennsylvania
Filed Jan. 21, 1966, Ser. No. 522,118
8 Claims. (Cl. 219—312)

This invention relates to an electric boiler for heating water or liquids other than water. It is suitable for use in either low or high pressure heating systems of the direct or indirect types.

By way of example, the boiler of this invention is suitable for use in hot water space heating systems either as a new installation or as a replacement in an existing system, in domestic water heating systems for instantaneous delivery of hot water or in conjunction with a storage tank, in swimming pool water heating system, in snow melting systems and in industrial heat processing systems. It is suitable for use as a steam boiler.

The boiler of the invention is highly advantageous in that it provides a marked improvement in heat transfer from electric heating elements to liquid in the boiler. Heat transfer is accomplished in a manner to maximize uniform heating of all the liquid in the boiler and minimize local overheating of the liquid and the electric heating elements. The design and construction of the boiler permits the use of a large proportionate volume of water or liquid per unit of electric heating element capacity to minimize overheating and cavitation of the liquid. The boiler of the invention may be provided with an air space above the normal liquid level for the purpose of receiving air and vapor released from the heated liquid within the boiler and for reducing operating pressures due to expansion of the heated liquid content in system. In accordance with the invention a novel arrangement of electric heating elements and internal deflectors is employed to promote effective heat transfer while providing for a generally open waterway with minimum resistance to liquid flow and eliminating the possibility of obstruction of waterways with sludges, lime scale and the like. Additionally, the internal deflectors may function as structural reinforcements. Further, the application of the internal deflectors and electric heating elements is such that the entire internal surfaces of the boiler are readily accessible for cleaning.

The invention is advantageous in that it provides:
(a) A shell of substantially open waterways utilizing internal deflectors;
(b) A novel tiering arrangement of electric heating elements to provide a wide source of heat distribution to the liquid;
(c) A plurality of internal deflectors providing divided parallel flow of liquid upwardly through the entire length of the boiler to assure uniform heat transfer to the liquid;
(d) The use of a large volume of liquid to assure ample heat absorbing capacity at a low rate of temperature change;
(e) A boiler shell construction providing negligible resistance to liquid flow;
(f) A boiler shell not susceptible to obstruction with sludge, lime scale or other solid contamination;
(g) Application of electric heating elements which is not susceptible to overheating and assures longer operating life;
(h) Application of electric heating elements with internal baffling which assures quieter operation because of more effective heat transfer and lower liquid circulating rate within the boiler; and
(i) Internal baffling assuring uniform heating characteristics within boiler minimizing overheating and susceptibility to liquid cavitation.

The invention and its objects will be further clarified by reading the following description in conjunction with the drawings in which:

FIGURE 3 is a vertical section taken on the plane indicated by the line 3—3 in FIGURE 1.

Figures 1, 2:
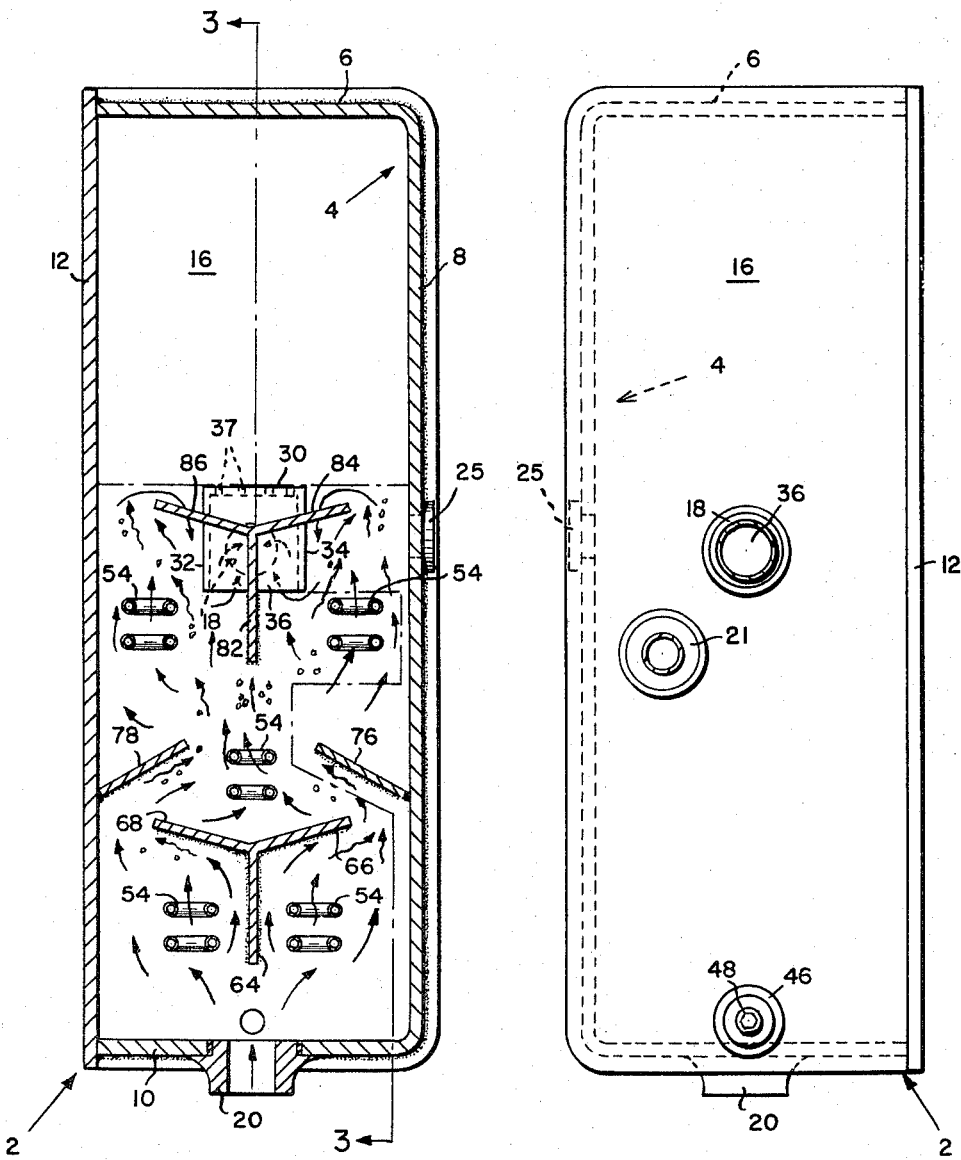
FIGURE 1 is a vertical section through a boiler in accordance with the invention.
FIGURE 2 is a right-hand elevation of the boiler of FIGURE 1 with the discharge line disconnected.

A boiler 2 in accordance with the invention is formed from steel plates welded together to form a boiler shell having a U-shaped plate 4 (FIGURE 1) forming a top wall 6, a side wall 8 and a bottom wall 10. Plate 4 is welded to a side wall plate 12. In turn plates 4 and 12 are welded to end wall plates 14 and 16 (FIGURE 3). A liquid return connection 20 is provided in bottom wall 10 and end wall plate 16 has a liquid supply connection 18 to which system supply piping 18A provided with a combined temperature and pressure gauge 18B is secured and a control connection 21 to which is connected line 21A to which is connected a relief valve 22 and a liquid level control device 23, such as a float type air vent, to establish a liquid level 24 in the boiler. A connection 25 is provided for a conventional liquid temperature control (not shown) located adjacent the liquid supply connection to regulate the temperature of the liquid within the boiler and leaving the boiler.

An air separator 28 is mounted within the boiler and adjacent supply connection 18 to prevent air and vapor from entering the system supply piping 18A. Air separator 28 has a top baffle wall 30, side baffle walls 32 and 34 welded to plate 16 and an end baffle wall 36 which, in effect, form a hood over supply connection 18 having only an open lower portion and a plurality of small openings 37 in top wall 30 for the elimination of any air or vapor that may be entrapped within air separator 28.

A portion of the boiler 2 extends above the liquid level 24 to form an air space 40 for the purpose of receiving air or vapor that may be released within the boiler. This air space eliminates the necessity for external devices customarily used in heating systems to provide for expansion of heating system water or other liquid.

A drain connection 46 in plate 16 is provided for the purpose of washing out sludges and corrosive products from the bottom of the boiler and is closed by plug 48 or equipped with a conventional drain cock (not illustrated).

As best seen in FIGURE 1, a pair of electric resistance heating elements 54, 54 are mounted in the lower portion of the boiler extending longitudinally thereof for substantially the length of the boiler shell with one on each side of the center line. Each heating element 54 passes through an opening 55 in plate 14 and has a flanged end member 56 which is bolted to end wall plate 14 over a gasket 58 by bolts indicated at 60 (FIGURE 3). The heating element 54 per se being conventional, it need not be further detailed here. A substantially vertical deflector 64 extending the full length of the boiler is positioned between said heating elements and extends above the heating elements. An outwardly and upwardly extending deflector 66 extends over one of these heating elements and an outwardly and upwardly extending deflector 68 extends over the other heating element. Deflectors 66 and 68 as shown specifically are integral with deflector 64 and extend the full length of the boiler. Deflectors 64, 66 and 68 are welded at one end to end wall plate 14 as indicated at 70 and to end wall plate 16 as indicated at 72 thus providing structural strength for the boiler shell. These deflectors primarily serve the purpose of directing the liquid circulation uniformily over the entire length of heater elements in a horizontal and upward direction.

A third heating element 54 substantially on the center line of the boiler and extending longitudinally thereof for substantially the length of the boiler shell is mounted above the aforementioned deflectors. Substantially opposite the third heating element 54 and inwardly and upwardly extending deflector 76 is secured by welding to side wall 8. Similarly, substantially opposite the third heating element 54 an inwardly and upwardly extending deflector 78 is secured by welding to side wall plate 12. Deflectors 76 and 78 are welded to end wall plates 14 and 16 to contribute to the structural strength of the boiler. Deflectors 76 and 78 are provided to direct liquid circulation upwardly over the length of the third electric heating element 54.

A fourth and fifth heating element 54, 54 are respectively mounted in the boiler above the third heating element and adjacent side wall 8 and side wall plate 12. A substantially vertical deflector 82 on the center line of the boiler lies between the fourth and fifth heating elements 54 and extends above the heating elements. An outwardly and upwardly extending deflector 84 integral with deflector 82 extends to the right of deflector 82 (as viewed in FIGURE 1) and partly over the adjacent heating element 54. Similarly, an outwardly and upwardly extending deflector 86 integral with deflector 82 extends to the left (as viewed in FIGURE 1) and partly over the adjacent heating element 54. Deflector 82 is welded to end wall plate 14 as indicated at 88 and to end wall 16 as indicated at 89 thus serving to provide for structural support of the boiler shell. These deflectors extend from the cut-down portion 83 at one end of deflector 82 to the other end of deflector 82 and primarily serve the purpose of directing the liquid circulation uniformly and upwardly over the entire length of the adjacent heater elements as well as prolonging the liquid circulation within the boiler so that a maximum of air and vapor will be released to the air space above the water level 24 before entering the liquid outlet connection 18.

Deflector 82 has a cut-down portion 83 at one end to provide clearance for the installation of the water temperature control sensing element (not shown) when used in conjunction with control connection 25.

It will be understood that the boiler can be made from a wide variety of materials other than steel plate, for example, cast iron and others, and may be associated with a wide variety of devices conventionally associated with boilers, such as, circulating pumps, operating controls and safety devices for liquid circulation, control of the liquid temperature, regulation of the electric heating elements operation, pressure relief and other functions well known to the art.

To facilitate cleaning the inside of the boiler, all the electric heating elements 54 are removed to expose all internal surfaces so that a conventional brush and water under pressure will effectively clean all surfaces. In normal operation sludges and other solid contaminants which may settle on top of non-vertical internal deflectors 66, 68, 76, 78, 84 and 86 will wash away to the bottom of the boiler through washout openings 102 provided in each of the ends of deflectors 66, 68, 76 and 78 and in one end of deflectors 84 and 86.

*Operation*

Since the most common use of the boiler will be in space heating systems of the hot water type, its operation will be described in connection with water heating. Assuming one or more of the electric heating elements to be activated and water to be flowing into boiler 2 through connection 20, the path of water flow can best be seen in FIGURE 1. The vertical baffle 64 and deflectors 66 and 68 cause a substantially equal amount of water to flow past in a horizontal manner and upwardly over the entire length of each of the adjacent heating elements 54. Deflectors 66 and 68 cause the water flowing upwardly past the two heating elements first contacted to be directed outwardly which prolongs the water travel in the boiler and results in mixing of the water to promote even distribution of the heat therethrough. Further, mixing is caused by the redirection of the water towards the center line of the boiler by deflectors 76 and 78. Further, these deflectors cause the water to uniformly flow upwardly over the entire length of the third heating element 54. Vertical deflector 82 causes substantially equal amounts of water to flow upwardly past the fourth and fifth heating elements and to be further directed outwardly to the outer edges of the boiler by the deflectors 84 and 86 following which water flows to the end of the boiler provided with connection 18 connected to the heating system.

Due to the heating of the water, bubbles of air and vapor are released therein. A large portion of this air and vapor moves upwardly and discharges into the air space 40. In order to insure that substantially all of the air and vapor is released into the air space 40 the flow of water must pass air separator 30 which by its baffling action separates the remaining air and vapor from the water before it enters the system supply piping 18A through connection 18.

The above described embodiment of the invention is by way of illustration and is not intended to be limiting.

What is claimed is:

1. A boiler comprising:
   a shell having parallel side and parallel end walls and a greater length than width,
   a pair of electric resistance heating elements in the lower portion of the shell extending longitudinally of the shell with one on each side of the center line thereof,
   a substantially vertical deflector between said heating elements and extending above the heating elements,
   an outwardly and upwardly extending deflector above each heating element and connected to the vertical deflector,
   a third heating element substantially on the center line of the boiler and above the outwardly and upwardly extending deflectors, and
   a pair of inwardly and upwardly extending deflectors with each of said last mentioned deflectors adjacent a different side wall substantially opposite the third heating element,
   said boiler having a lower inlet and an upper outlet.

2. A boiler in accordance with claim 1 having:
   fourth and fifth heating elements above said inwardly and upwardly extending deflectors and on opposite sides of the center line of the boiler respectively,
   a second vertical deflector between the fourth and fifth heating elements and substantially on the boiler center line, and
   an outwardly and upwardly extending deflector above each of the fourth and fifth heating elements and connected to the second vertical deflector.

3. A boiler in accordance with claim 1 in which a plurality of the deflectors are secured to a pair of opposite walls to increase the structural strength of the boiler shell.

4. A boiler in accordance with claim 1 in which the boiler shell extends substantially above the outlet to form an air space.

5. A boiler in accordance with claim 2 in which a plurality of the deflectors are secured to a pair of opposite walls to increase the structural strength of the boiler shell.

6. A boiler in accordance with claim 2 in which the boiler shell extends substantially above the outlet to form an air space.

7. A boiler in accordance with claim 2 having an air separator comprising a top baffle wall extending longitudinally from the end wall above the outlet, a pair of depending side baffle walls connected to the top baffle wall and the end wall adjacent the outlet and a depending end baffle wall connected to the top and side baffle walls.

8. A boiler in accordance with claim 3 having an air separator comprising a top baffle wall extending longitudinally from the end wall above the outlet, a pair of side walls connected to the top baffle wall and the end wall adjacent the opening and an end baffle wall connected to the top and side baffle walls.

References Cited

UNITED STATES PATENTS

| 944,050 | 12/1909 | Rains | 219—319 X |
| 1,731,058 | 10/1929 | Pierson | 219—335 |
| 2,179,781 | 11/1939 | Frankel et al. | 219—316 |

RICHARD M. WOOD, *Primary Examiner.*

C. ALBRITTON, *Assistant Examiner.*